No. 638,441. Patented Dec. 5, 1899.
F. BURGER.
FLUSHING APPARATUS FOR BOWLS, TANKS, &c.
(Application filed Mar. 21, 1898.)
(No Model.)
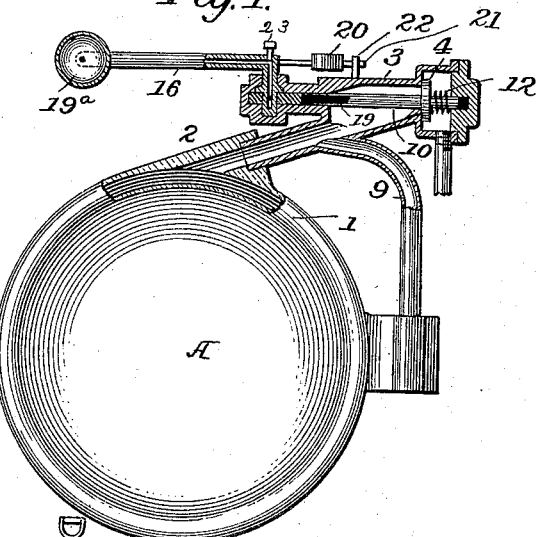
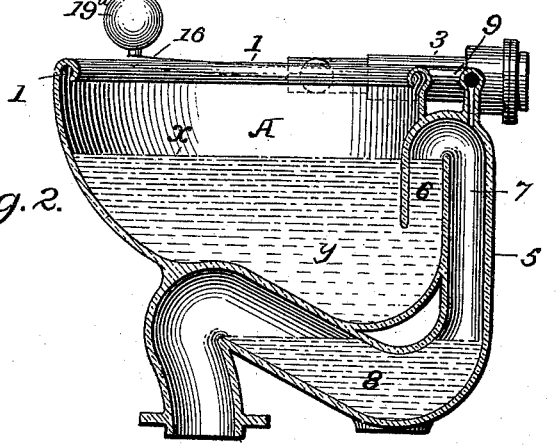
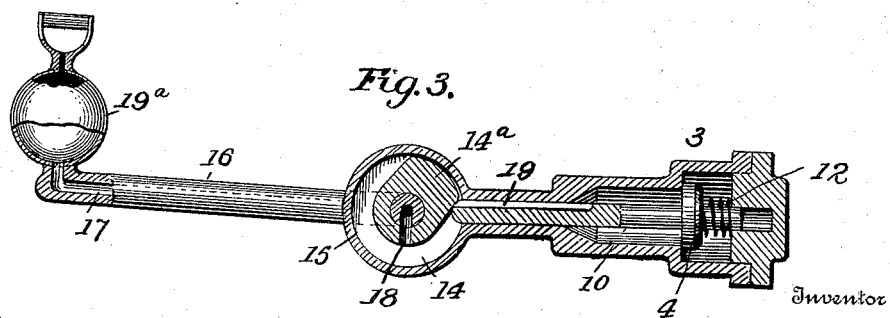
Witnesses
Inventor
Franz Burger

UNITED STATES PATENT OFFICE.

FRANZ BURGER, OF FORT WAYNE, INDIANA, ASSIGNOR OF THREE-FOURTHS TO HENRY M. WILLIAMS, OF SAME PLACE.

FLUSHING APPARATUS FOR BOWLS, TANKS, &c.

SPECIFICATION forming part of Letters Patent No. 638,441, dated December 5, 1899.

Application filed March 21, 1898. Serial No. 674,660. (No model.)

*To all whom it may concern:*

Be it known that I, FRANZ BURGER, a citizen of the United States, residing at Fort Wayne, in the county of Allen and State of Indiana, have invented certain new and useful Improvements in Flushing Apparatus for Bowls, Tanks, &c., of which the following is a specification.

This invention relates to certain new and useful improvements in apparatus for flushing tanks, closet-bowls, &c., having for its object to provide simple and effective means for accomplishing this without the employment of the usual overhead water-tanks; and with this object in view the invention consists in the novel construction and arrangement of parts hereinafter more particularly described.

In the accompanying drawings, forming a part of this specification and in which like letters and numerals of reference designate corresponding parts, Figure 1 is a horizoutal sectional view of apparatus embodying the invention. Fig. 2 is a vertical sectional view thereof, and Fig. 3 is a detail view of the valve and its operating mechanism.

Briefly stated, the invention comprises a bowl provided with a siphon discharge-pipe leading therefrom and connecting at its lower end with the usual gooseneck-trap. Leading to the bowl at its upper edge is a water-inlet pipe provided with a valve and means for operating the same, and means are also provided for creating a vacuum in the siphon discharge-pipe whenever the inlet-valve is open, whereby the water standing in the gooseneck-trap is drawn upward until it meets the water in the bowl, resulting in the contents of the bowl being siphoned out.

Referring more particularly to the drawings, A designates the bowl of a closet, which may be of any suitable shape and is preferably provided interiorly at its upper edge with an annular water-distributing passage 1. Connecting with this passage 1 and extending tangentially to the same is a water-inlet pipe 2, provided with a valve-casing 3, formed with a valve-seat for a valve 4. Leading from the bowl A is a siphon-pipe 5, the short arm 6 of which extends from a point about centrally of the depth of the bowl, and the long arm 7 connects with a water-trap 8. Connecting the top of the siphon-pipe 5 and the water-inlet pipe 2 is a suction-pipe 9, entering the inlet-pipe in the same general direction of the flow of water therethrough. Assuming now the water in the bowl to be at the level (designated at $x$) and the inlet-valve to be open, water will rush through the inlet-pipe 2 and distributing-passage 1 into the bowl. The rush of the water past the mouth of the suction-pipe 9 creates a suction therein, causing the air to be exhausted therefrom and from the long leg of the siphon and creating a vacuum therein. This vacuum thus created is sufficient to draw the water in the trap 8 up to the top of the siphon, where it unites with the water in the bowl and completes the siphon, causing the water in the bowl to be withdrawn until it reaches the level at $y$, when the end of the short arm of the siphon is uncovered and air rushes into the siphon and the discharge of the water is arrested. When the water reaches the level $y$, it is necessary that the inflow of water through the inlet-pipe 2 be discontinued, otherwise another vacuum will be created and the bowl will again be emptied, and it is also necessary that water be supplied to the bowl to raise the level therein from the point $y$ to the point $x$. In order to accomplish this, automatic means are provided for closing the inlet-valve 4 at a predetermined time, and while different means may be provided for effecting this purpose it is preferred to employ those which will now be described on account of the simplicity and effectiveness.

The valve 4 is provided with a stem 10, projecting upon opposite sides thereof, and surrounding one end and interposed between the valve and its casing is a coil-spring 12, which serves to hold the valve to its seat. The opposite end of the valve is provided with a longitudinal groove 19 and projects into a circular chamber 14. Within this chamber is a cam $14^a$, mounted upon a short arm 15 of an operating-lever 16, the said arm 15 being arranged at right angles to the long arm of the lever and extending into the casing through the side thereof. When the lever 16 is lifted, the cam is brought into contact with the end of the valve-stem 10 and forces the valve 4 from its seat, allowing the water to rush through the inlet-pipe 2 and at the same time flow through the groove 19 in the valve-stem to the chamber 14. Extending longitudinally through the lever 16 and its arm is a channel 17, which communicates with the chamber 14 through a passage 18 in the cam 14ª. Upon the opposite end of the lever 16 is a reservoir 19ª, which likewise communicates at its bottom with the channel 17 and at its top with the external atmosphere, and said reservoir is provided with a handle 20, by means of which it and the lever 16 may be lifted. In operation when the lever 16 and reservoir 19ª are elevated the cam 14ª is turned and presses upon the valve-stem 10, forcing the valve 4 from its seat. The water then flows into the bowl A and at the same time flows into the chamber 14 and thence through the passage 18 and channel 17 to the reservoir 19ª. When the reservoir becomes filled with water, the weight thereof is sufficient to overcome a counterweight 20 at the opposite end of the lever 16 and the lever and reservoir drop to their lowered position, thereby effecting the closing of the valve 4. As before stated, when the inlet-valve closes the water in the bowl is at the level $y$; but the water stored within the reservoir now being undeterred flows through the channel 17, passage 18, and groove 19 into the inlet-pipe 2 and thence into the bowl, bringing the level of the water therein to the point $X$.

In order to limit the downward movement of the lever 16, it is provided with a projection 21, adapted to make contact with a pin 22, extending from the bowl or its frame. It is sometimes desirable that the bowl or tank be flushed for a longer time than at others, and in order to effect this a screw-valve 23 is provided for controlling the channel through the lever 16, and it will readily be seen that if the said channel be partially closed a longer time will be required to fill the reservoir 19, and in consequence the lever 16 will not drop nor the valve 4 be closed as soon as it otherwise would if the channel were wholly open.

Without limiting myself to the exact construction and arrangement of parts shown and described, since it will be understood that such construction and arrangement may be varied without departing from the scope or spirit of my invention,

I claim—

1. In flushing apparatus, the combination of a bowl, a siphon discharge-pipe leading therefrom and communicating with a water-trap, an inlet-pipe leading to the bowl, a spring-seated valve within the pipe, a grooved stem connected to the valve, a chamber 14, into which said stem projects, a cam within said chamber to engage the end of the stem, a tubular angle-lever having its short arm journaled in the side of the chamber and on which the cam is mounted, said tubular lever being in communication with the chamber, a reservoir on the free end of the long arm of the lever also in communication therewith, a handhold on the reservoir, and a counterbalancing weighted arm extending from the short arm of the lever, substantially as and for the purpose specified.

2. In a flushing apparatus, the combination of a bowl, an inlet-pipe leading to the bowl, a valve within said pipe, means embracing a movable counterbalanced reservoir for operating the valve, and a tubular connection between the inlet-pipe and the reservoir, said reservoir receiving water from the inlet-pipe through the tubular connection when the valve is open, and discharging the water so received into the inlet-pipe, through the same tubular connection, when the valve is closed, substantially as and for the purpose specified.

In testimony whereof I have signed my name to this specification in the presence of two subscribing witnesses.

FRANZ BURGER.

Witnesses:
GEO. K. TORRENCE,
J. BURGER.